(12) United States Patent
Sarangi et al.

(10) Patent No.: US 6,874,083 B2
(45) Date of Patent: Mar. 29, 2005

(54) METHOD AND APPARATUS TO ENSURE PROPER VOLTAGE AND FREQUENCY CONFIGURATION SIGNALS ARE DEFINED BEFORE APPLYING POWER TO PROCESSOR

(75) Inventors: Ananda Sarangi, Beaverton, OR (US); Rachael Jade Parker, Forest Grove, OR (US); Edward P. Osburn, Folsom, CA (US); Gregory F. Taylor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 09/746,168

(22) Filed: Dec. 22, 2000

(65) Prior Publication Data

US 2002/0120882 A1 Aug. 29, 2002

(51) Int. Cl.⁷ .................... G06F 1/24; G06F 1/32
(52) U.S. Cl. ................ 713/100; 713/1; 713/2; 713/300; 713/320; 713/322
(58) Field of Search .................... 713/1, 2, 100, 713/300, 320, 322, 400, 401, 500, 501, 502, 503, 600, 601; 716/1; 257/529

(56) References Cited

U.S. PATENT DOCUMENTS

| | | | | |
|---|---|---|---|---|
| 5,446,403 A | * | 8/1995 | Witkowski | 327/143 |
| 5,630,090 A | * | 5/1997 | Keehn et al. | 713/323 |
| 5,758,170 A | * | 5/1998 | Woodward et al. | 710/267 |
| 5,764,529 A | * | 6/1998 | Capps et al. | 716/1 |
| 5,862,351 A | * | 1/1999 | He | 710/104 |
| 5,951,681 A | * | 9/1999 | Chang | 713/1 |
| 6,275,364 B1 | * | 8/2001 | Voit | 361/18 |
| 6,327,663 B2 | * | 12/2001 | Isaac et al. | 713/300 |
| 6,433,405 B1 | * | 8/2002 | Gunderson et al. | 257/529 |
| 6,567,868 B1 | * | 5/2003 | Tran et al. | 713/500 |
| 6,601,167 B1 | * | 7/2003 | Gibson et al. | 713/2 |
| 6,791,157 B1 | * | 9/2004 | Casto et al. | 257/529 |

FOREIGN PATENT DOCUMENTS

JP          070200526 A    *    8/1995     ...........  G06F/15/78

OTHER PUBLICATIONS

Aggarwal, G.; N.; Aggarwal, K.; Balakrishnan, M.; Kumar, S.; "A novel reconfigurable co-processor architecture", VLS Design, 1997. Proceedings., Tenth International Conference on, Jan. 4–7, 1997.*

* cited by examiner

*Primary Examiner*—Lynne H. Browne
*Assistant Examiner*—James K. Trujillo
(74) *Attorney, Agent, or Firm*—Blakely, Sokoloff, Taylor & Zafman LLP

(57) ABSTRACT

A dynamic processor configuration and power-up programs a processor's fuse block with configuration signals during processor manufacturing. The processor configuration signals include a core voltage identifier and a system bus frequency identifier. When power is applied to the platform, a control signal is used to prevent power-up of the platform's processor related circuitry. While the platform awaits full power-up, the fuse block is powered up. When the fuse block is powered up, the control signal is used to allow the configuration signals to be read from the fuse block. The processor is configured with core voltage and system bus frequency based on the values read from the fuse block. The platform then performs its boot-up sequence.

17 Claims, 9 Drawing Sheets

METHOD AND APPARATUS TO ENSURE PROPER VOLTAGE AND FREQUENCY CONFIGURATION SIGNALS ARE DEFINED BEFORE APPLYING POWER TO PROCESSOR

BACKGROUND OF THE INVENTION

1. Field of the Invention

The invention relates to the field of integrated circuit devices. More particularly, the invention relates to dynamic configuration of processor chips.

2. Background Information

In a computer system, configuration signals, such as those that define voltage and bus clock frequency needed for proper operation of the system's processor, are set by hard wiring a set of pins located on the processor package or by providing a resistor pull up/down stuffing option. This means that when a configuration signal changes, the processor package has to change or the Bill of Materials and resistor population must change, respectively.

For example, designers typically develop and use a new package for each combination of configuration signals for a given processor. Having a new processor package for each combination of configuration signals is not desirable especially considering that configuration signals typically change several times during the processor's lifetime. If there are three different operating frequencies for a particular processor, engineers design three different processor packages to accommodate the three frequencies. Similarly, if there are three different operating voltages for a particular processor, engineers design three different processor packages to accommodate the three voltages. If there were three operating frequencies and three operating voltages for a particular processor, there would be nine different processor packages.

Having more than one package for a particular processor merely because a voltage or frequency changes generally causes logistics issues to arise during manufacturing of processor packages. There may be delays due to lead-time of the new package, for example. Having more than one package for a particular processor also generates a significant cost overhead. Not only do new packages have to be designed, but the new packages have to be maintained in inventory and be quality assured. This can be burdensome, time consuming, and uneconomical.

Using a resistor stuffing option, results in liability problems and possible reliability problems resulting from illegal alteration to the stuffing configuration. Processor re-markers may alter the configuration stuffing options to increase operational frequency and stability in order to illegally resell the product as a higher performance product than it was designed for. This may lead to reduced product reliability and inherent stability problems resulting from operating the part out of specifications.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

A system and corresponding method for dynamic configuration and power-up of a processor integrated circuit is described in detail herein. Various aspects of the invention are described as well. However, it will be apparent to those skilled in the art that the invention may be practiced with only some or all aspects of the invention. For purposes of explanation, specific numbers, methods, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Some parts of the description will be presented using terms such as particular signals, voltages, voltage regulators, processors, clock generators, and so forth, commonly employed by those skilled in the art to convey the substance of their work to others skilled in the art. Other parts of the description will be presented in terms of operations performed by a computer system, using terms such as accessing, determining, counting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

The invention is described below in further detail with respect to several examples for illustration. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
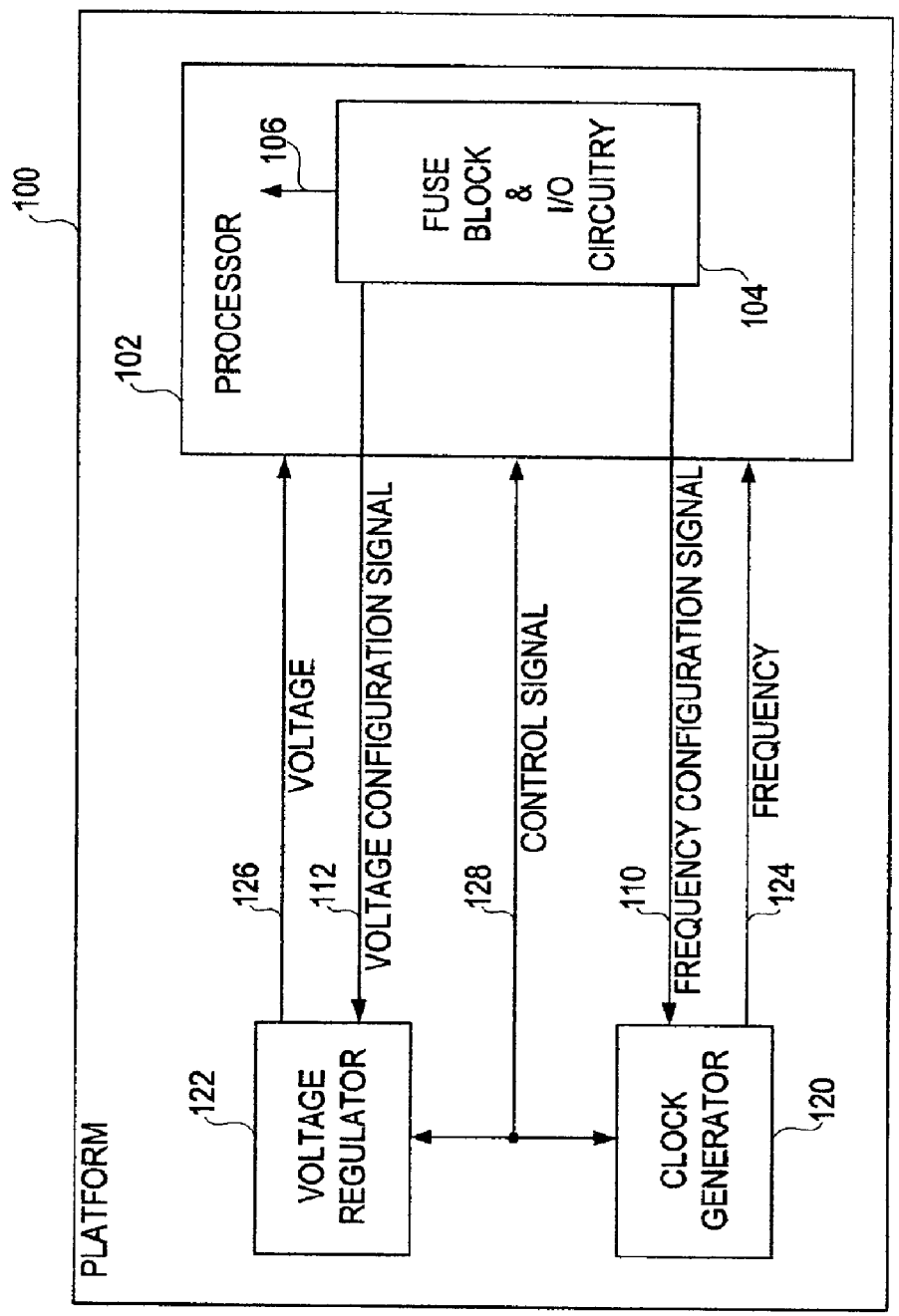
FIG. 1 is a block diagram of a computer platform suitable for implementing embodiments of the present invention.

FIG. 1 is a high-level block diagram of a platform 100 suitable for implementing an embodiment of the present invention. The platform 100 is typically a computer platform that supports a high-performance desktop, a workstation, a server, etc. In one embodiment, the platform 100 is a UNIX platform. In other embodiments, the platform 100 may be Windows® or Windows® NT platform. Those skilled in the art will appreciate that a variety of platforms may be used when implementing the present invention.

The platform 100 includes a processor 102, which performs its conventional functions of executing programming instructions including implementing many of the teachings of the present invention. The processor 102 can be a processor of the Pentium® processor family available from Intel Corporation of Santa Clara, Calif. but might be any processor which utilizes configuration signals, such as for voltage and clock frequency determination.

The processor 102 includes front-end logic to receive a control signal to inhibit boot up normal of the processor 102 in response to receiving power. As is well known, when a processor is "booting," "boots up," performs a "normal boot process," etc., the processor determines the devices that are connected to it (e.g., printers, facsimiles, etc.), the operating system that is running on the platform (e.g., Linux, Windows®, etc.), and the software programs installed on the platform (e.g., Microsoft® Word, WordPerfect®, etc.). Aspects of the present invention permit the use of fuses that require power to be read to be used to configure the power supply voltage of the processor that contains the fuses.

In one embodiment, the processor 102 has on-die a fuse block and configuration input/output (I/O) circuitry 104 powered by an I/O voltage plane 106. The fuse block and configuration I/O circuitry 104 has a fuse block portion and an I/O circuitry portion. The fuse block portion of the fuse block and configuration I/O circuitry 104 includes programmable fuses, which can be programmed during manufacturing of the processor 102. Programming the fuse block 106 is accomplished using any well-known technique. The I/O circuitry portion includes buffers, drivers, etc., to actively drive the programmed configuration signals.

One feature of the present invention sets the configuration signals by programming a fuse block in the processor 102. In one embodiment, a frequency configuration signal 110 and a voltage configuration signal 112 are programmed into the fuse block portion during manufacturing the processor 102's die. An advantage of this feature is that the same package can be used for a variety of configuration signals. There does not need to be a different processor package for each set of configuration signals. The result is fewer processor packages over the lifetime of the processor.

Another feature of the present invention alters the configuration signals by reprogramming the fuse block in the processor 102. For example, when the frequency or voltage requirements for the processor 102 change, the frequency configuration signal 110 and the voltage configuration signal 112 can be re-programmed into the fuse block portion. An advantage of this feature is that processor 102's manufacturers can change the processor 102 configuration signals and ship product samples to original equipment manufacturers (OEM) in a matter of a day or two for test and validation.

The platform 100 also includes a clock generator 120 and a voltage regulator 122. The clock generator 120 supplies the processor 102 (and other platform 100 circuitry) with a clock 124 after reading the frequency configuration signal 110. The voltage regulator 122 supplies the processor 102 with a voltage 126 after reading a voltage configuration signal 112. In one embodiment, the voltage regulator 122 also provides the voltage for the I/O voltage plane 106.

The voltage regulator 122 or platform logic also generates a control signal 128. When the platform 100 is powered up, the control signal 128 prevents initiation of the normal boot process until the voltage and frequency configuration signals, 110 and 112 respectively, are valid and stable. The control signal 128 controls interaction among the voltage regulator 122, the clock generator 120, the processor 102, and any other platform 100 circuitry that is configured by an output from the processor such that when there is an indication that voltage and frequency configuration signals 110 and 112 are valid and stable, the control signal 128 allows the platform 100 to begin a normal boot process.

Figure 2A:
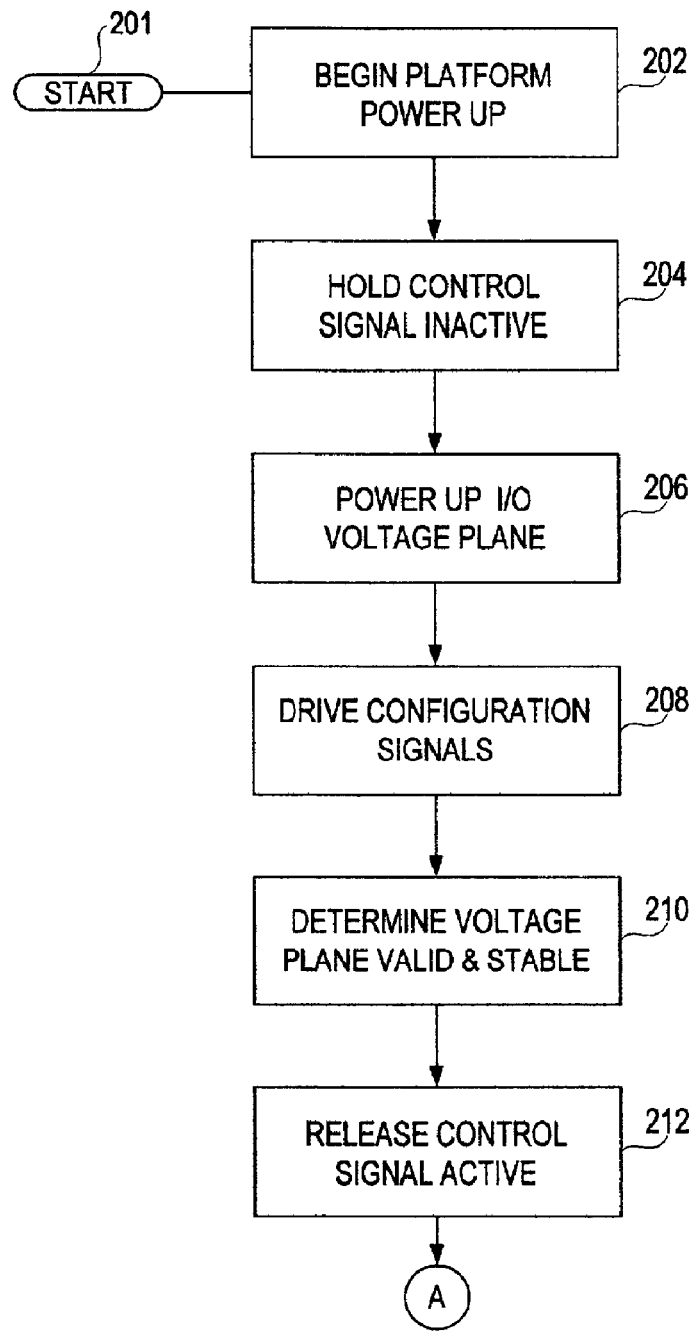
FIGS. 2A and 2B show a flow chart of an approach to implementing several embodiments of the present invention.
Figure 2B:
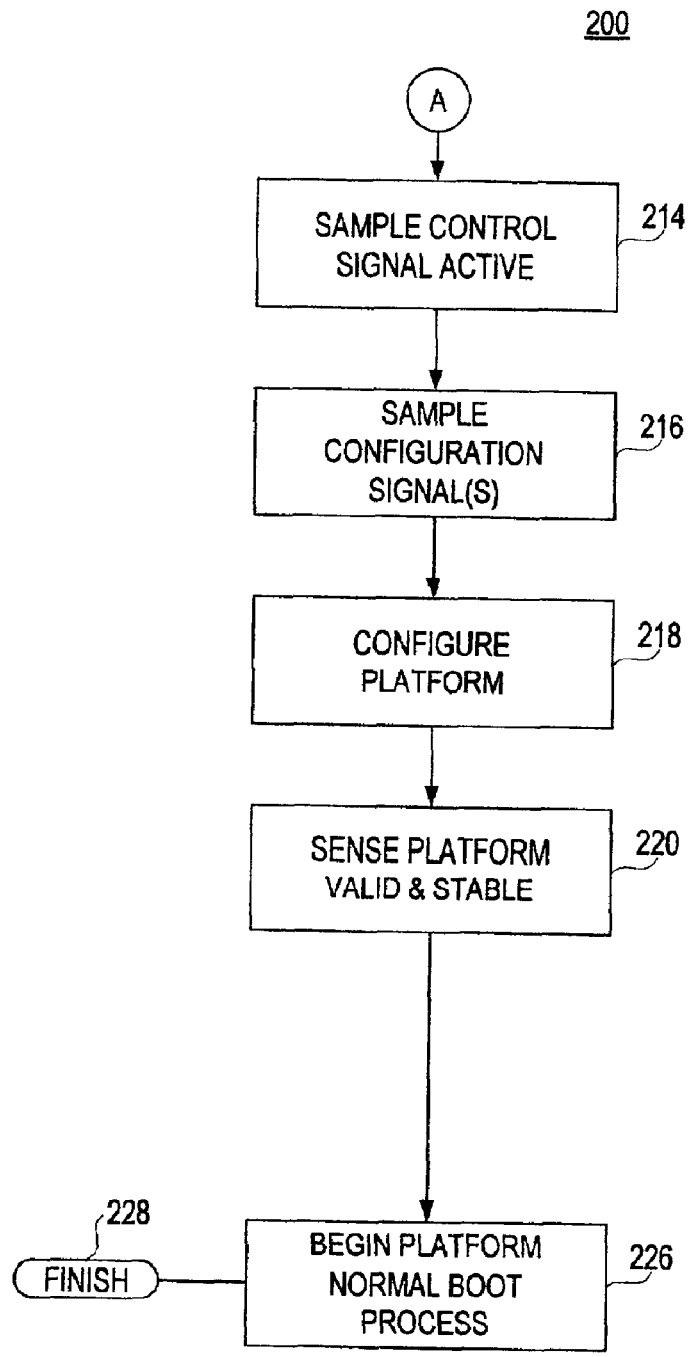

FIGS. 2A and 2B show a flow chart of a dynamic processor configuration and power up method 200 according to aspects of the present invention. Using the method 200, only a part of the platform 100 circuitry is powered up initially. This circuitry is the circuitry that communicates from the processor 102 exactly what voltage and other configuration information the processor 102 desires.

Operation of the method 200 begins with step 201, where control immediately passes to step 202. In step 202, the platform 100 begins to power up. This typically occurs when the platform 100 receives a signal to cause the platform 100's power supply to turn on. In one embodiment, a "power-ON" signal is generated by hardware and/or software in the platform 100. For example, a power-ON signal may be generated by operating an ON-OFF button, switch, etc., on the platform 100. In any event, the power-ON signal is active upon platform 100 power up.

In step 204, the control signal 128 is held inactive. The processor 102 receives the control signal 128, which, being inactive, inhibits the processor 102 from performing a normal boot process, and the voltage regulator 122 and the clock generator 120 from sampling the configurations signals 112 and 110, respectively. In one embodiment, the voltage regulator 122 holds the control signal 128 inactive. The voltage regulator 122 may hold the control signal 128 inactive until some time after the I/O voltage plane 106 is valid and stable.

In step 206, the I/O voltage plane 106 is powered up, and in step 208, the configuration signals are driven by the processor 102. In one embodiment, the I/O voltage plane 106 powers the processor 102 and the processor 102 drives the voltage and frequency configuration signals 110 and 112 (or drives the fuse block 106 to provide the voltage and frequency configuration signals 110 and 112). In other embodiments, the processor 102 drives other configuration signals.

In step 210, the platform 100 determines that the I/O voltage plane 106 is valid and stable. In an embodiment, the voltage regulator 122 determines that the I/O voltage plane 106 is valid and stable and then waits a predetermined time period, e.g., one millisecond. When the predetermined time period elapses, the voltage regulator 122, in step 212, releases the control signal 128 active.

In step 214, the control signal 128 is sampled active. In one embodiment, the voltage regulator 122 and the clock generator 120 sample the control signal 128 active.

In step 216, the configuration signals are sampled. In one embodiment, the voltage regulator 120 samples the voltage configuration signal 110 and the clock generator 120 samples the frequency configuration signal 112.

In step 218, the platform 100 is configured. In one embodiment, the voltage regulator 122 provides the voltage 126 to the processor 102 based on the sampled voltage configuration signal 110 and the clock generator 120 generates the frequency 124 for the processor 102 and for other platform 100 circuitry based on the sampled frequency configuration signal 112.

In step 220, the platform 100 senses that the platform 100 is valid and stable. In one embodiment, the voltage regulator 122 senses that the clocks and power supplies in the platform 100 are valid and stable. A CPU_PWRGD signal is generated on the platform at this time.

In step 226, the platform 100 begins a normal boot process, and in step 228, the method 200 finishes.

Figure 3:
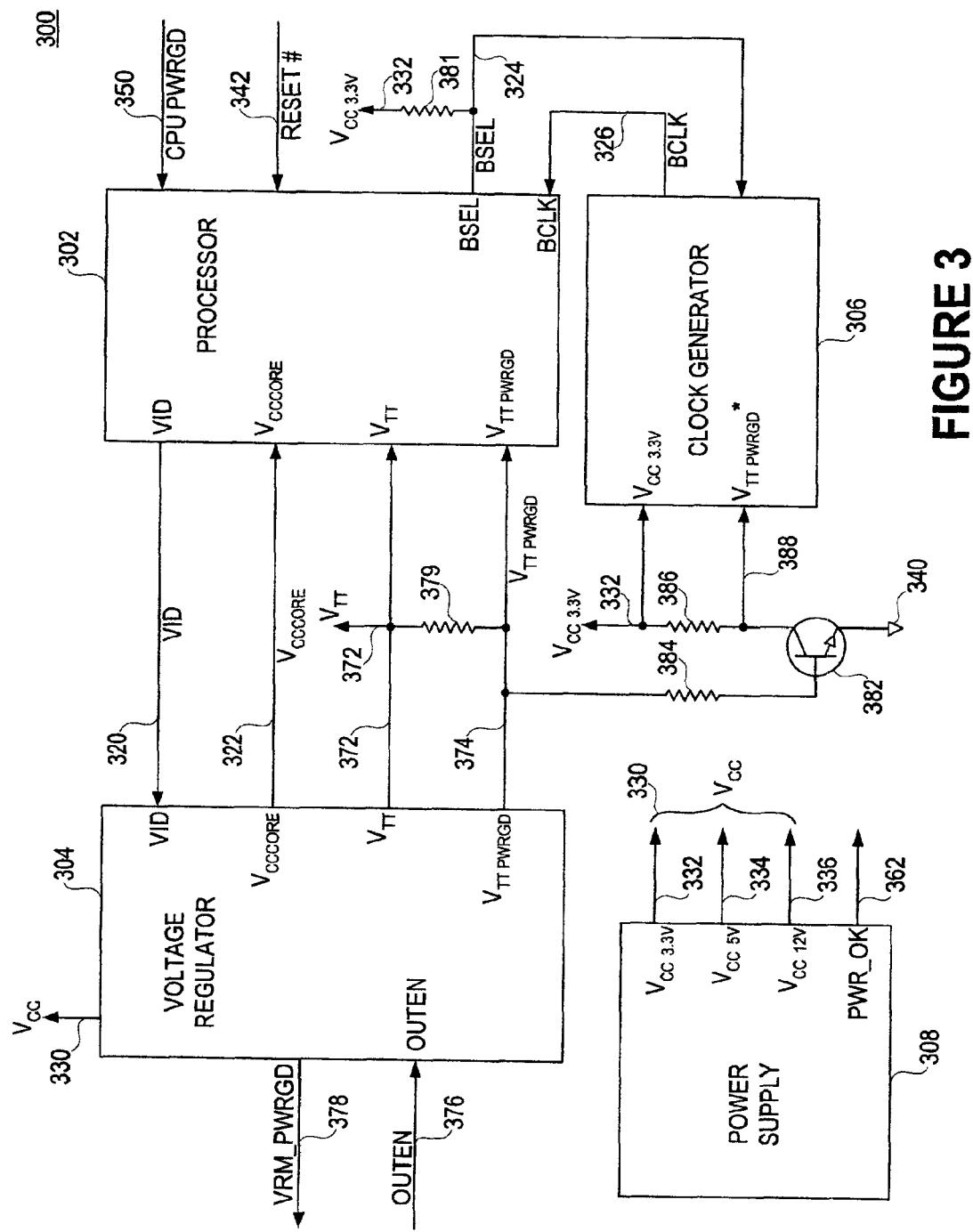
FIG. 3 is a block diagram of a computer platform that has an integrated core voltage and input/output (I/O) voltage regulator solution.

FIG. 3 is a high-level block diagram of a platform 300 suitable for implementing alternative embodiments of the present invention. The platform 300 performs the same or similar functions as the platform 100. The platform 300 includes a processor 302, a voltage regulator 304, a clock generator 306, and a power supply 308.

The processor 302, which is similar to the processor 102, is typically packaged on a well-known flip chip pin grid array (FC-PGA) or plastic pin grid array (PPGA) that uses a well-known PGA370 socket for installation into a motherboard (not shown). (As is well known, a motherboard combines processors and chipsets (or logic) to form a subsystem of a computer platform.) The PGA 370 socket includes 370 pins, many of which are dedicated to configuration signals, clock signals, signals that indicate whether voltages are valid and stable, control signals, voltage planes, voltages, and so forth, and connects the signals and voltages between the processor 302's die and the PGA 370 connector.

In one embodiment of the present invention, there may be several pins on the processor 302's package for receiving the voltage required to properly operate the processor 302's core and for specifying the voltage required to properly operate the processor 302's core. For example, a voltage identification configuration signal (VID 320) appears on one or more pins to specify the voltage required for proper operation of the processor 302's core and a core voltage ($V_{CCCORE}$ 322) appears on one or more pins to receive the voltage to properly operate the processor 302's core.

Conventionally, the pins for VID 320 are not signals, but are either open circuits or short circuits to ground such that the combination of opens and shorts defines VID 320. According to aspects of the present invention, VID 320 is programmed into the processor 302's fuse block during manufacturing, and may be four bits wide, five bits wide, etc. The voltage regulator 304 reads VID 320 and generates $V_{CCCORE}$ 322, which can be 1.5 volts, 3.2 volts, etc. $V_{CCCORE}$ 322 also may power on-die caches.

In one embodiment of the present invention, there may be one or more pins on the processor 302's package for receiving the clock required to properly operate the platform 300 and for specifying the frequency required to properly operate the platform 300. For example, a system bus frequency select configuration signal (BSEL 324) appears on one or more pins to specify the frequency required for proper operation of the platform 300 and a system bus clock (or front side bus frequency) (BCLK 326) appears on a pin(s) to receive the frequency at which to properly operate the platform 300.

Conventionally, the pins for BSEL 324 are not signals, but are either open circuits or short circuits to ground such that the combination of opens and shorts defines BSEL 324. According to aspects of the present invention, BSEL 324 is programmed into the processor 302's fuse block during manufacturing, and may be two bits wide, five bits wide, etc. The clock generator 306 reads BSEL 324 and generates BCLK 326. BCLK 326 may supply the processor 302, the platform 300 chipsets, etc. The processor 302 uses BCLK 326 to generate the processor 302's core frequency, which typically is a multiple of BCLK 326. In one embodiment, BCLK 326 is one hundred megahertz (MHz). In other embodiments, BCLK 326 can be 200 MHz, 133 MHz, 66 MHz, etc.

In one embodiment of the present invention, there may be one or more pins on the processor 302's package for receiving a supply voltage ($V_{CCCORE}$ 322), which is generated by the voltage regulator 304. The voltage regulator 304 generates the supply voltage ($V_{CCCORE}$ 322) to the processor from the power supply 308 input supply voltage 330. Because different circuits and/or components within the platform 300 may operate at different voltages, there are usually several supply voltages available from the power supply 308. In one embodiment, "$V_{CC3.3V}$ 332" refers to a 3.3 volt supply voltage for the platform 300, "$V_{CC5V}$ 334" refers to a five-volt supply voltage for the platform 300, and "$V_{CC12V}$ 336" refers to a twelve-volt supply voltage for the platform 300. The power supply 308 also generates a signal (PW-OK 362) that indicates to the platform 300's processor board that the voltages supplied by the power supply 308 are stable and within their specifications.

There also may be one or more pins on the processor 302's package for system ground ($V_{SS}$ 340) and for receiving a signal to cause the processor 302 to immediately initialize (RESET# 342). There may be one or more pins on the processor 302's package for receiving a signal (CPU PWRGD 350) to indicate that the clocks and power supplies for the platform 100 are stable and within their specifications. For example, CPU PWRGD 350 indicates when BCLK 326 and $V_{CCCORE}$ 322 are valid and stable on the processor 302.

There may be one or more pins on the processor 302's package for an I/O voltage ($V_{TT}$ 372). In one embodiment, the voltage regulator 304 generates $V_{TT}$ 372 for the processor 302's I/O plane. Typically, $V_{TT}$ 372 is the first voltage to provide power to the processor 302.

The voltage regulator 304 also generates a "$V_{TT\_PWRGD}$ 374" signal, which indicates that $V_{TT}$ 372 is stable and valid and controls when the platform 300 can begin a normal boot process. In one embodiment, $V_{TT\_PWRGD}$ 374 is an active high signal.

Note that $V_{TT\_PWRGD}$ 374 is an input and an output to the voltage regulator 304, which allows the voltage regulator 304 to prevent processors that can plug into the PGA 370 socket but which are not equipped with a $V_{TT\_PWRGD}$ 374 strobe from powering up with $V_{CCCORE}$ 322. Such processors tie to ground the pin used for the $V_{TT\_PWRGD}$ 374 strobe. For example, a processor should be capable of sending back a stable and valid $V_{TT\_PWRGD}$ 374 before the voltage regulator 304 sends $V_{CCCORE}$ 322 to the processor.

The voltage regulator 304 can be a direct current-to-direct current (DC-to-DC) voltage converter powered by $V_{CC3.3V}$ 332, $V_{CC5V}$ 334, or $V_{CC12V}$ 336. The voltage regulator 304 in one embodiment is a circuit on the processor 302's board with the necessary complement of external capacitance. In an alternative embodiment, the voltage regulator 304 is a plug-in module with the necessary complement of capacitance and possibly capacitance on the processor 302's board to ensure proper voltages and currents.

An "OUTEN 376" signal enables and disables the output voltage(s) from the voltage regulator 304. Once enabled, the voltage regulator 304 generates a "$VRM\_{PWRGD}$ 378" signal, which indicates that voltage(s) and current(s) generated by the voltage regulator 304 are stable and within their specifications. VRM_PWRGD 378 is sent from the voltage regulator 304 to the motherboard logic to generate CPU PWRGD 350. The OUTEN signal 376 is generated by motherboard logic.

According to one embodiment, the clock generator 306 is controlled by an inverted $V_{TT\_PWRGD}$ 374 signal, $V_{TT\_PWRGD}$* 388, which enables and disables sampling of the BSEL 324 signal and is powered by $V_{CC3.3V}$ 332. Once enabled, the clock generator 306 can read BSEL 324 and generate BCLK 326. Clock generators suitable for implementing the clock generator 306 are well known and can be single ended or differential.

The platform 300 also includes a resistor 379, a resistor(s) 381, a transistor 382, a resistor 384, and a resistor 386. The resistor 379 is coupled between the processor 302 and the voltage regulator 304 to pull up $V_{TT\_PWRGD}$ 374 to $V_{TT}$ 372. This configuration eliminates power-sequencing issues between the processor 302 and the voltage regulator 304. For example, if $V_{TT\_PWRGD}$ 374 were pulled up to $V_{CC3.3V}$ 332 and $V_{CC3.3V}$ 332 became stable and valid before $V_{TT}$ 372 became stable and valid, $V_{TT\_PWRGD}$ 374 would appear to be stable and valid even though $V_{TT}$ 372 was not stable and valid. If $V_{TT}$ 372 is not stable and valid, the processor 302's I/O circuitry that drives the configuration signals has no power from $V_{TT}$ 372. Pulling $V_{TT\_PWRGD}$ 374 up to $V_{TT}$ 372 with the resistor 379 ensures that $V_{TT\_PWRGD}$ 374 does not become stable and valid until the processor 302's I/O circuitry has power. In one embodiment, the resistor 379 is one thousand ohms.

The resistor 381 is coupled between $V_{CC3.3V}$ and BSEL 324 to pull up BSEL 324 to $V_{CC3.3V}$ 332, which is the clock generator 306 power supply, to prevent power sequencing problems between the clock generator 306 and $V_{TT\_PWRGD}$* 388. If BSEL 324 was pulled up to another voltage that lagged $V_{TT\_PWRGD}$* 388 and the clock generator 306 power supply ($V_{CC3.3V}$ 332), then the BSEL 324 signal may not be valid and an incorrect BSEL 324 may be read by the clock generator 306. In one embodiment resistor 380 is a 330 ohm resistor.

The transistor 382 is coupled between the voltage regulator 304 and the clock generator 306, and is powered by $V_{CC3.3V}$ 332 via the resistor 386. Using the resistor 386 to pull up the transistor 382's collector to $V_{CC3.3V}$ 332 eliminates power-sequencing issues between the $V_{TT\_PWRGD}$* 388 and the clock generator 306. Pulling the transistor 382 up to $V_{CC3.3V}$ 332 and not $V_{TT}$ 372 ensures that the clock generator 306 has both power and a valid and stable $V_{TT\_PWRGD}$* 388 before the clock generator 306 reads the BSEL 324 signal and drives the BCLK 326 to the processor 302.

In one embodiment, the transistor 382's base is coupled to the $V_{TT\_PWRGD}$ 374 output of the voltage regulator 304 via the resistor 384. The transistor 382's collector is coupled to the $V_{TT\_PWRGD}$* 388 input of the clock generator 306. The transistor 382's emitter is coupled to $V_{SS}$ 340. As such, the transistor 382 couples the $V_{TT\_PWRGD}$ 374 from the voltage regulator 304 to the clock generator 324 as $V_{TT\_PWRGD}$* 388. In one embodiment, the resistor 384 is twenty thousand ohms and the resistor 386 is ten thousand ohms.

To minimize the effects of noise, the transistor 382 is in close proximity to the clock generator 306. For example, if there is noise on $V_{TT\_PWRGD}$ 374's line when $V_{TT\_PWRGD}$ 374 is inactive, the noise may cause $V_{TT\_PWRGD}$* 388 to appear active before making a valid transition to the active state. If $V_{TT\_PWRGD}$* 388 appears active before it should, the clock generator 306 will generate the wrong value for BCLK 326. If the clock generator 306 generates the wrong value for BCLK 326, the processor 302 and other circuitry would not be operating at the correct frequency. This may cause the performance of the platform 300 to be slower than desired. Alternatively, the frequency may be so high that the platform 300 may fail to operate properly. Placing the transistor 382 in close proximity to the clock generator 306 minimizes the chances that the clock generator will erroneously read an active $V_{TT\_PWRGD}$* 388 due to noise.

With the transistor 382 far from the clock generator 306, capacitance may be needed to minimize noise. However, as the pull-up resistor 386 is charging up the capacitance may hold the $V_{TT\_PWRGD}$* 388 down long enough for the clock generator 306 to consider $V_{TT\_PWRGD}$* 388 to be valid, which it is not. Proper placement of the transistor 382 eliminates the need for the extra capacitance.

Because the clock generator 306 uses the inverted $V_{TT\_PWRGD}$ 374 ($V_{TT\_PWRGD}$* 388) as an enable latch, $V_{TT\_PWRGD}$* 388 must be substantially glitch-free. When the power supply 308 is rising up to its appropriate voltage and current levels, $V_{TT}$ 372 is rising to its appropriate voltage level. As a result of the power supply 308 and $V_{TT}$ 372 being in transition while the clock generator 306 is coming up to its appropriate voltage level, $V_{TT\_PWRGD}$ 374 may have some noise. Inverting $V_{TT\_PWRGD}$ 374 with the transistor 382 and biasing the pull-up resistor properly with $V_{CC3.3V}$ 332, clock generator 306 supply voltage, ensures that the clock generator 306 is enabled by a glitch-free $V_{TT\_PWRGD}$* 388 strobe with proper timing.

Figure 4A:
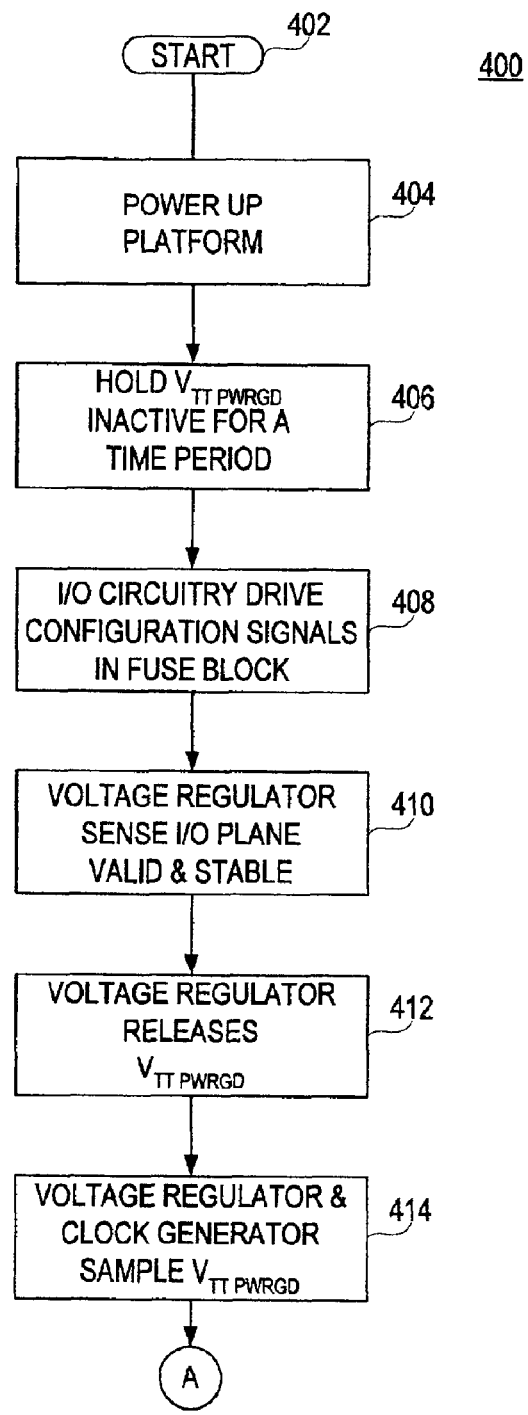
FIGS. 4A and 4B show a flow chart of an approach to implementing several embodiments of the present invention.
Figure 4B:
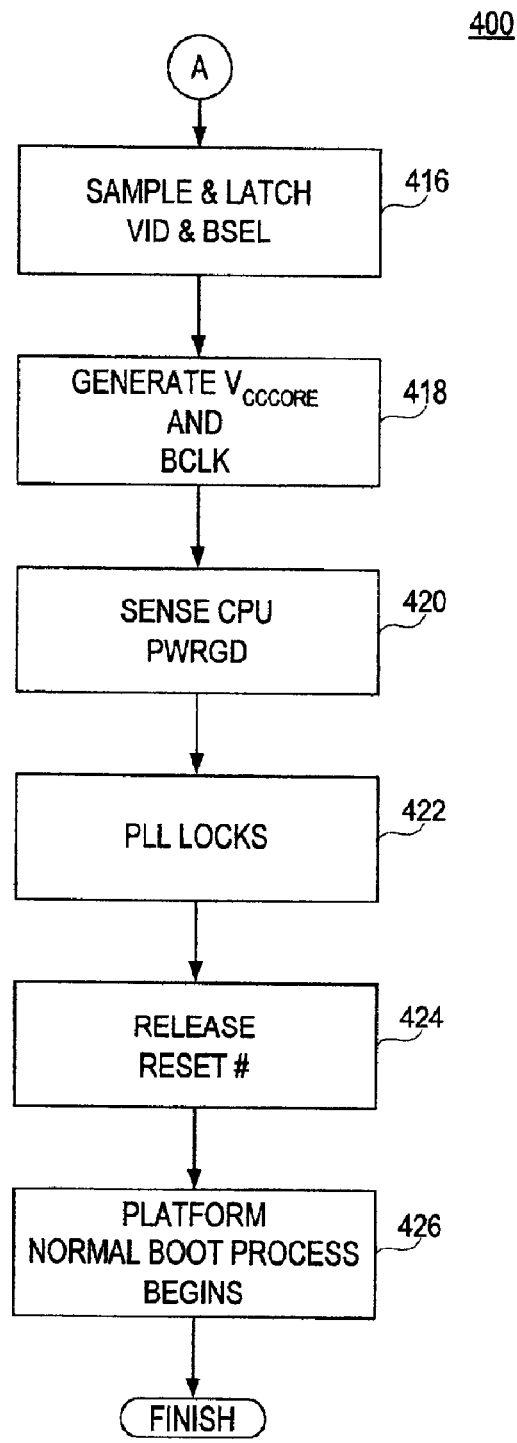

FIGS. 4A and 4B show a flow chart of a dynamic processor configuration and power up method 400 according to aspects of the present invention. Operation of the method 400 begins with step 402, where control immediately passes to step 404. In step 404, the platform 300 begins to power up.

In step 406, $V_{TT\_PWRGD}$ 374 is held inactive until some time after $V_{TT}$ 372 crosses a threshold voltage level. Waiting for the time period to elapse ensures that the voltage on the I/O plane has stabilized to $V_{TT}$ 372. In one embodiment, the voltage regulator 304 holds $V_{TT\_PWRGD}$ 374 inactive until one millisecond but not more than five milliseconds has elapsed following $V_{TT}$ 372 crossing at least 1.08 volts. In one embodiment, the voltage regulator 304 holds $V_{TT\_PWRGD}$ 374 inactive until this time has passed.

In step 408 and during the time that $V_{TT\_PWRGD}$ 374 is held inactive, the processor 302's I/O circuitry drives the configuration signals as stored in the processor 302's fuse block. As the voltage regulator 304 begins to power up $V_{TT}$ 372 already powered the processor 302's I/O circuitry.

In step 410, the voltage regulator 304 compares the processor 302's I/O voltage plane to an internally generated reference voltage and senses when the plane is valid and stable.

After the time period has elapsed, in step 412, the voltage regulator 304 releases $V_{TT\_PWRGD}$ 374, which then is pulled up to $V_{TT}$ 372 by the resistor 379.

In step 414, after $V_{TT\_PWRGD}$ 374 is released, the voltage regulator 304 and the clock generator 306 each samples $V_{TT\_PWRGD}$ 374. If $V_{TT\_PWRGD}$ 374 is inactive, the voltage regulator 304 is prevented from latching VID 320 or driving $V_{CCCORE}$ 322 to the processor 302 and the clock generator 306 is prevented from latching BSEL 324 or driving BCLK 326 to the processor 302.

In step 416, the voltage regulator 304 samples VID 320, and the clock generator 306 samples and latches BSEL 324.

In step 418, the voltage regulator 304 generates $V_{CCCORE}$ 322 and the clock generator 306 generates BCLK 326.

In step 420, the processor 302 senses CPU PWRGOOD 350, which indicates that the clocks and power supplies in the platform 300 are valid and stable.

In step 422, the processor 302's phase lock loop (PLL) locks. The PLL is a well-known processor circuit used in conjunction with the processor clock.

In step 424, RESET# 342 is released and becomes inactive. RESET# 342 may be controlled by operation of a RESET# 342 switch on the platform 300 and/or logic that connects to logic on the platform 300, such as the power supply 308's PW-OK 362 signal. In one embodiment, RESET# 342 is active for a predetermined time period, e.g., several milliseconds, after $V_{CCCORE}$ 322 and BCLK 326 are valid and stable and the PW-OK 362 signal is active.

In step 426, the platform 300 begins a normal boot process.

If the processor 302's I/O plane loses power from $V_{TT}$ 372 and the voltage regulator 304 still has power from $V_{CC}$ 330, $V_{CC3.3V}$ 332, $V_{CC5V}$ 334, or $V_{CC12V}$ 336, then $V_{TT\_PWRGD}$ 374 becomes inactive. When $V_{TT\_PWRGD}$ 374 becomes inactive, the voltage regulator 304 stops generating $V_{CCCORE}$ 322 for the processor 302 and VRM_PWRGD 378 becomes inactive.

Figure 5:
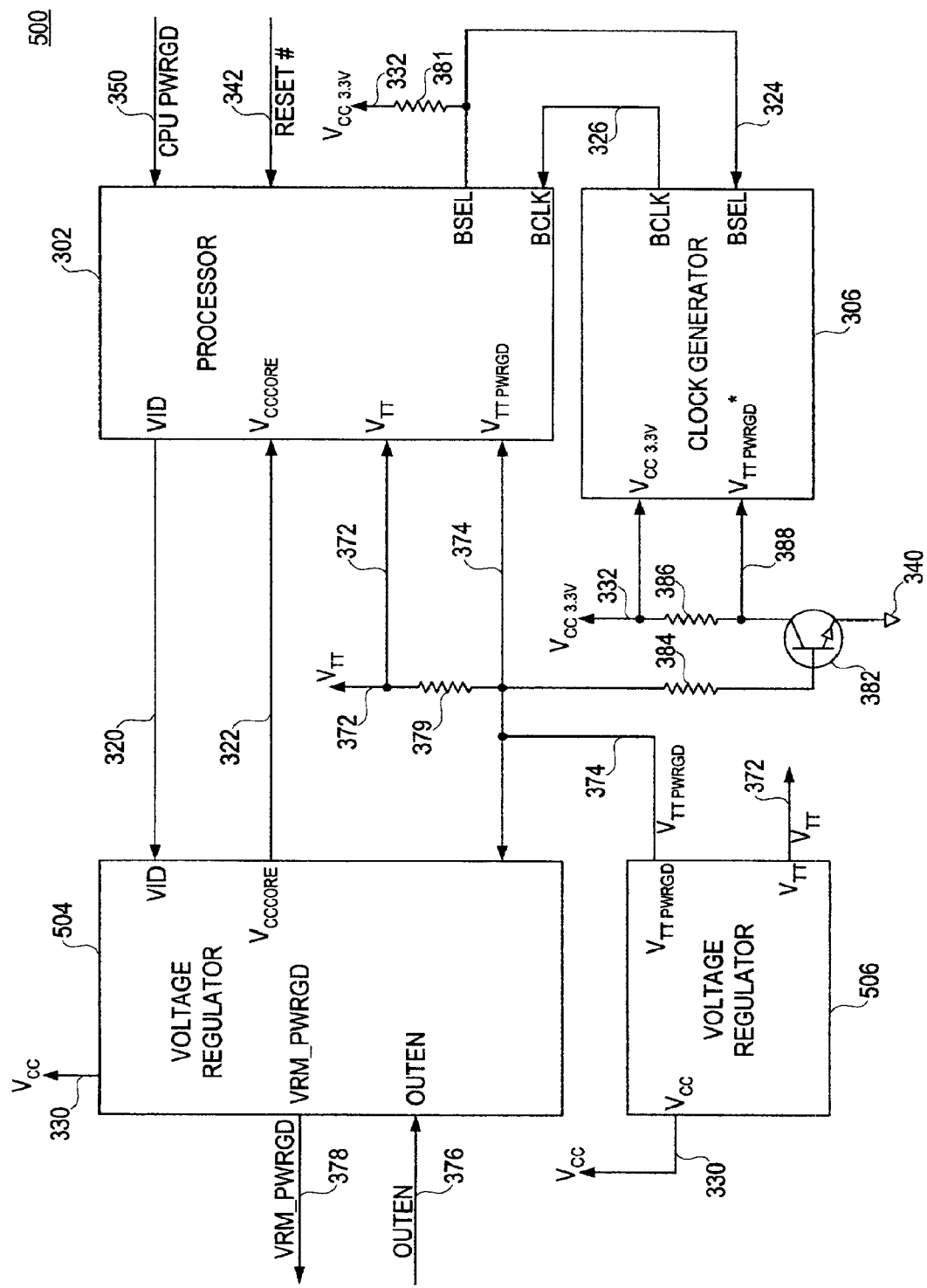
FIG. 5 is a block diagram of a computer platform that has a multiple component core voltage and input/output (I/O) voltage regulator solution.

FIG. 5 is a high-level block diagram of an alternative platform 500 that is similar to the platform 300. While the platform 300 implements an integrated $V_{CCCORE}$ 322 and $V_{TT}$ 372 solution by having the voltage regulator 304 generate $V_{CCCORE}$ 322, $V_{TT}$ 372, and $V_{TT\_PWRGD}$ 374, the platform 500 implements a multiple component solution.

More specifically, the platform 500 includes two separate voltage regulators. One voltage regulator 504 generates $V_{CCCORE}$ 322. A second voltage regulator 506 generates $V_{TT}$ 372 and $V_{TT\_PWRGD}$ 374. The voltage regulator 506 couples $V_{TT\_PWRGD}$ 374 to the processor 302, the voltage regulator 504, and the transistor 382 via the resistor 384. Thus, the voltage regulator 504 takes $V_{TT\_PWRGD}$ 374 as an input and relies on the voltage regulator 506 to control $V_{TT\_PWRGD}$ 374.

The platform 500 operates substantially in accordance with the method 400. However, the voltage regulator 506 performs the functions in steps 406, 410, and 412, and the voltage regulator 504 performs the functions in steps 414, 416, and 418 that the voltage regulator 304 can perform.

Figure 6:
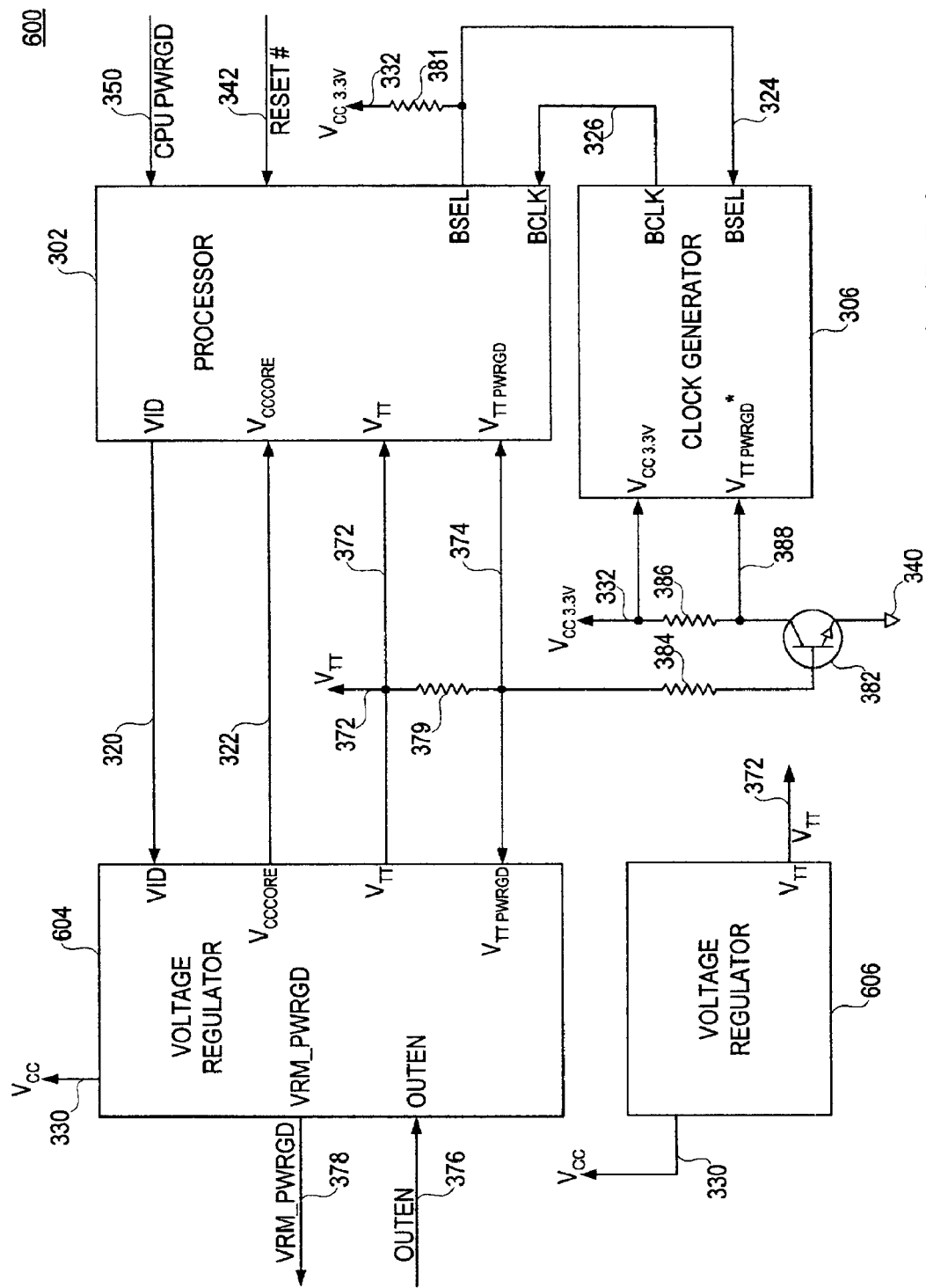
FIG. 6 is a block diagram of a computer platform that has an independent core voltage and input/output (I/O) voltage regulator.

FIG. 6 is a high-level block diagram of another alternative platform 600 that is similar to the platform 300 and the platform 500. For example, while the platform 300 implements an integrated $V_{CCCORE}$ 322 and $V_{TT}$ 372 solution by having the voltage regulator 304 generate $V_{CCCORE}$ 322, $V_{TT}$ 372, and $V_{TT\_PWRGD}$ 374, and the platform 500 implements a multiple component solution by having the voltage regulator 504 generate $V_{CCCORE}$ 322 and the voltage regulator 504 generate $V_{TT}$ 372, and $V_{TT\_PWRGD}$ 374, the platform 600 implements an integrated but independent $V_{CCCORE}$ 322 and $V_{TT}$ 372 solution.

More specifically, the platform 600 includes one voltage regulator module 604 to generate $V_{CCCORE}$ 322 and $V_{TT\_PWRGD}$ 374 and a second voltage regulator module 606 to generate $V_{TT}$ 372. The voltage regulator module 606 couples $V_{TT}$ 372 to the processor 302 and the voltage regulator module 604 senses $V_{TT}$ 372 on a SENSE input 608.

Regardless of the implementation in the platform 100, 300, 500, or 600, $V_{TT\_PWRGD}$ 374 is glitch free when held inactive and monotonic when transitioning from inactive to active. $V_{TT\_PWRGD}$ 374 is driven inactive before the processor 302's I/O plane begins to power up. A $V_{TT\_PWRGD}$ 374 driver in the particular voltage regulator module supports $V_{TT\_PWRGD}$ 374 being shorted to $V_{SS}$ 340.

Figure 7:
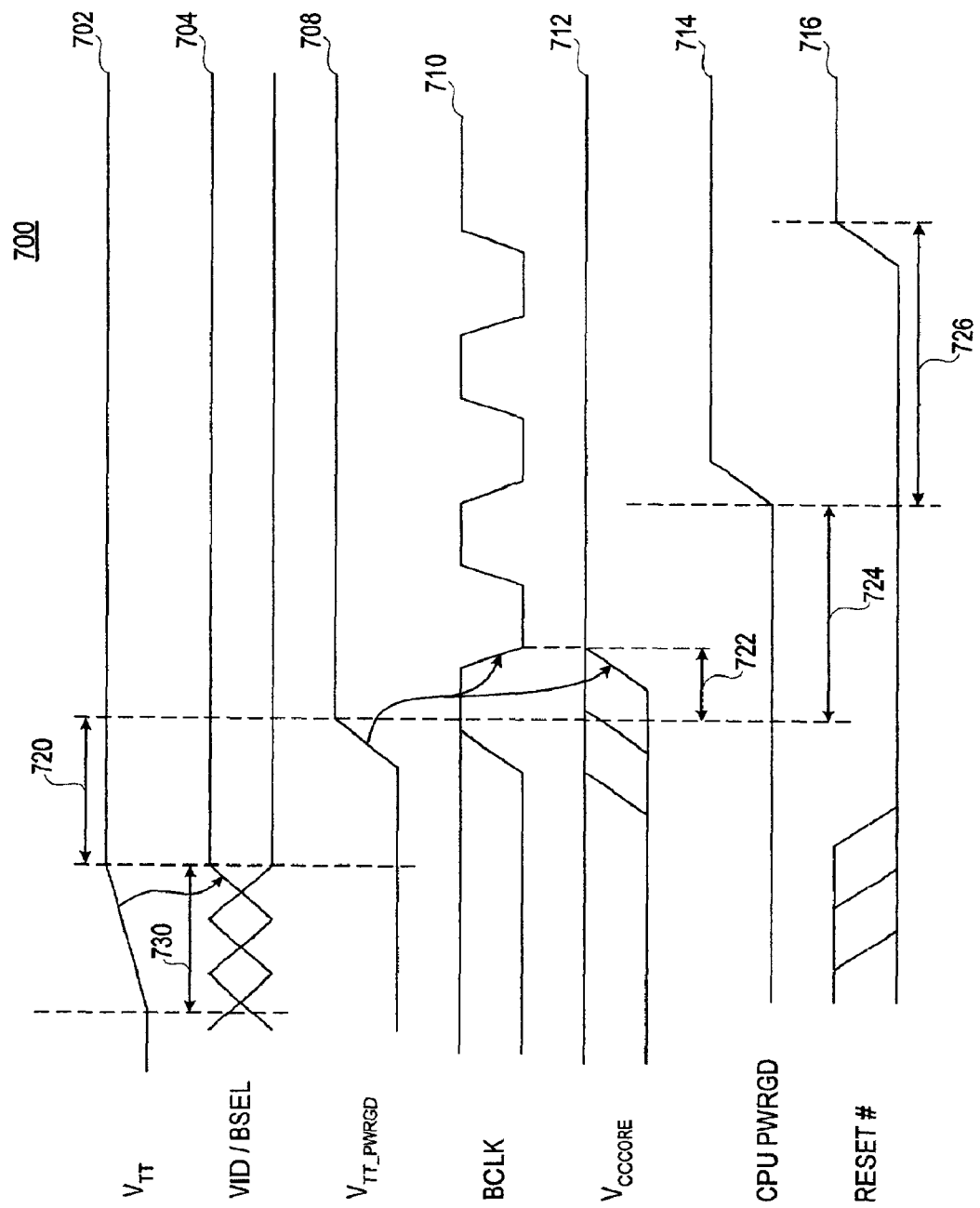
FIG. 7 shows the timing of the signals and power supplies used by a platform as that platform powers up.

FIG. 7 is a power and control sequencing graphical representation for the platforms 100, 300, 500, and/or 600 according to aspects of the present invention. For example, a timing diagram 702 indicates the timing of $V_{TT}$ 372 during platform power-up. A timing diagram 704 indicates the timing of VID 320 and BSEL 324 during platform power-up. A timing diagram 708 indicates the timing Of $V_{TT\_PWRGD}$ 374 during platform power-up. A timing diagram 710 indicates the timing of BCLK 326 during platform power-up. A timing diagram 712 indicates the timing of $V_{CCCORE}$ 326 during platform power-up. A timing diagram 714 indicates the timing of CPU PWRGD 350 during platform power-up. A timing diagram 716 indicates the timing of RESET# 342 during platform power-up.

A time period 720 shows the delay between when $V_{TT}$ 372 crosses a threshold voltage level and when $V_{TT\_PWRGD}$ 374 becomes active. Although $V_{TT}$ 372 has reached the threshold level, the platforms wait during the time period 720 for $V_{TT\_PWRGD}$ 374 to become active. Also during the time period 720 VID 320 and BSEL 324 become stable. After the time period 720 $V_{TT\_PWRGD}$ 374 may become active.

A time period 722 shows the delay between when $V_{TT\_PWRGD}$ 374 becomes valid and stable and when the voltage regulator samples the VID 320 signal and generates $V_{CCCORE}$ 322. Also during the time period 722, the clock generator 306 samples BSEL 324 and subsequently drives BCLK 326.

A time period 724 shows the delay between when $V_{TT\_PWRGD}$ 374 becomes valid and stable and when CPU PWRGD begins to transition from inactive to active. During the time period 724, the platforms' clocks and power supplies are all powered up and stable.

A time period 726 shows the delay between when the processors sense that BCLK 326 and $V_{CCCORE}$ 322 are present and stable and when the platforms begin a normal boot process by coming out of RESET# 342. During the time period 726, $V_{CCCORE}$ 322 is provided to the processor's phase locked loop circuit and the phase locked loop locks to stabilize BCLK 326 inside the processor 302.

While aspects of the present invention are described with reference to configuration signals such as a voltage identification configuration signal and a system bus frequency configuration signal, the present invention applies to any configuration signal that may be present in computer platforms. For example, the present invention applies to current configuration signals, other voltage and frequency configuration signals, etc.

Aspects of the invention can be implemented using hardware, software, or a combination of hardware and software. Such implementations include state machines, application specific integrated circuits (ASICs), field programmable gate arrays, (FPGA), etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a voltage regulator and a clock generator to send a processor voltage and a processor clock, respectively;
    a processor coupled to the voltage regulator to receive the processor voltage and the clock generator to receive the processor clock, respectively; and
    a control signal coupled to the processor, the voltage regulator, and the clock generator to prevent the processor from receiving the processor voltage and the processor clock until a fuse block programmed with a voltage configuration signal and a frequency configuration signal to specify the processor voltage and the processor clock frequency, respectively, is determined to have a proper supply voltage level.

2. The apparatus of claim 1, wherein the voltage regulator is coupled to send the processor voltage to the processor and the control signal to the processor and the clock generator.

3. The apparatus of claim 1, further comprising a second voltage regulator coupled to send the processor voltage to the processor and the control signal to the first voltage regulator, the processor, and the clock generator.

4. The apparatus of claim 1, further comprising a second voltage regulator coupled to send the processor voltage to the processor, and wherein the first voltage regulator is coupled to sense the supply voltage and to send the control signal to the processor and the clock generator.

5. The apparatus of claim 1, further comprising a transistor coupled to invert the control signal and send the inverted control signal to the clock generator.

6. A system, comprising:
    a processor having programmable fuse block programmed with at least one configuration signal;
    logic coupled to the processor to read the configuration signal and in response to generate a value specified by the configuration signal;
    a control signal coupled to the processor and the logic to prevent the logic from reading the configuration signal until a predetermined event occurs where in the predetermined event is when power to the programmable fuse block is valid and stable.

7. The system of claim 6, wherein the configuration signal specifies a voltage for the logic to generate.

8. The system of claim 6, wherein the configuration signal specifies a frequency for the logic to generate.

9. The system of claim 6, wherein the predetermined event is when the configuration signal is valid and stable.

10. An apparatus, comprising:
    a processor to receive a control signal to inhibit booting up until a fuse block disposed in the processor and programmed with a voltage configuration signal and a frequency configuration signal to specify a processor voltage and a processor clock frequency, respectively, is determined to have a proper supply voltage level.

11. The processor of claim 10, wherein the configuration signal is to inhibit booting up of the processor for a period of time.

12. The processor of claim 10, wherein the configuration signal is to inhibit booting up of the processor for a period of time after fuse block has power.

13. An article of manufacture, comprising:
    a machine-readable medium having stored thereon instructions for causing a processor to:
    receive a control signal to prevent a computer platform from booting until a voltage applied to a processor fuse block programmed with at least one configuration signal has reached a threshold level;
    receive the control signal to permit the processor fuse block to be read;
    configure the processor based on the configuration signals read from the fuse block; and
    permit the computer platform to boot.

14. The article of manufacture of claim 13, wherein the instructions are further to cause the processor to receive a core voltage or a system bus clock, respectively, specified by the configuration signals.

15. The article of manufacture of claim 13, wherein the instructions are further to cause the processor to receive the control signal to permit the processor fuse block to be read when a fuse block voltage has reached a threshold value.

16. The article of manufacture of claim 13, wherein the instructions are further to cause the processor to receive the control signal to permit a clock generator or a voltage regulator to read the processor fuse block when a fuse block voltage has reached a threshold value.

17. The article of manufacture of claim 16, wherein the instructions are further to cause the processor to receive a frequency signal or a voltage signal from the clock generator or voltage regulator after the clock generator or voltage regulator reads the processor fuse block.

* * * * *